United States Patent

[11] 3,609,538

| [72] | Inventor | Ronald H. Schag<br>Orange, Calif. |
|---|---|---|
| [21] | Appl. No. | 813,482 |
| [22] | Filed | Apr. 4, 1969 |
| [45] | Patented | Sept. 28, 1971 |
| [73] | Assignee | Thomas & Betts Corporation |

[54] A DEVICE TO IDENTIFY INDIVIDUAL WIRES IN A RANDOM BUNDLE
4 Claims, 4 Drawing Figs.

[52] U.S. Cl. .................................................. 324/66, 340/325
[51] Int. Cl. .......................................................... G01r 31/02
[50] Field of Search............................................ 324/51, 54, 66, 73, 99 D; 340/324, 325, 337

[56] References Cited
UNITED STATES PATENTS

| 1,927,045 | 9/1933 | Parsons .................... | 324/51 |
| 2,311,276 | 2/1943 | Wilcox ...................... | 324/51 UX |
| 2,953,744 | 9/1960 | Miller et al. .............. | 324/66 |
| 2,982,880 | 5/1961 | Klipstein .................. | 340/324 X |
| 2,996,669 | 8/1961 | Morgan et al............ | 324/99 |
| 3,068,403 | 12/1962 | Robinson .................. | 324/54 |
| 3,106,677 | 10/1963 | Edgar........................ | 324/54 |

*Primary Examiner*—Gerard R. Strecker
*Attorneys*—David Tescloner and Jesse Woldman ABSTRACT: A wire detector for determining the designation of a wire in a random bundle of wires which are connected at a first end to a group of designatory points, comprising connection means between said group of designatory points and a display device; a probe for contacting the second end of a wire in said bundle; said probe being coupled to said display device to complete a circuit through the selected wire, which causes the display device to indicate the designation thereof by displaying a predesignated symbol. The disclosure also sets forth various probes which permit wire identification without the need for prestripping or piercing of the wire insulation and which permits wire identification to be made at an extended distance.

INVENTOR.
RONALD H. SCHAG

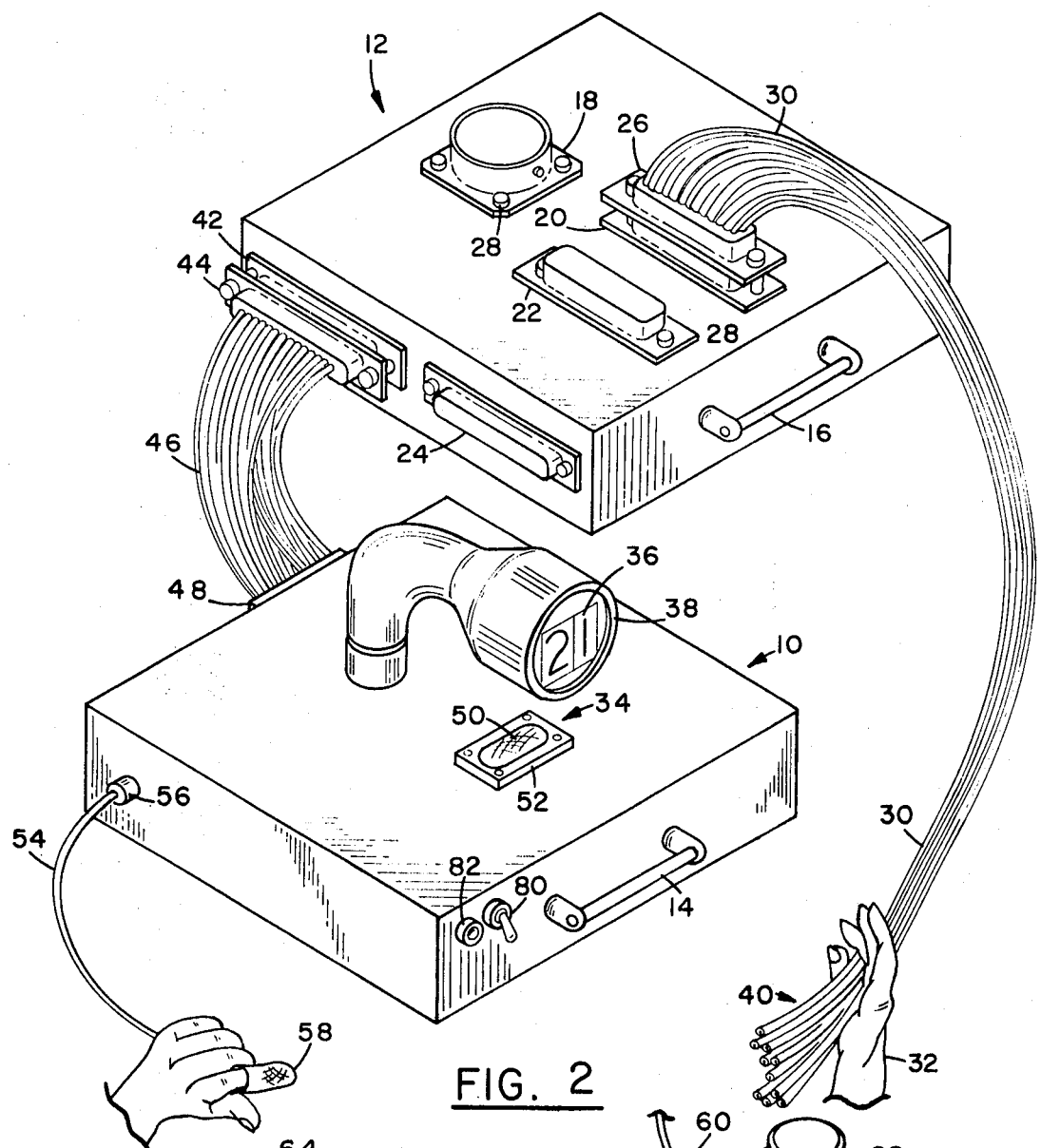
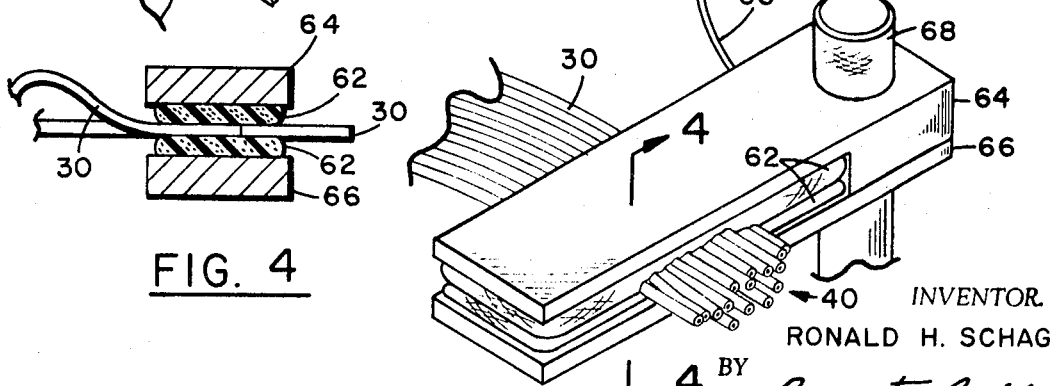
FIG. 2
FIG. 4
FIG. 3
INVENTOR.
RONALD H. SCHAG
BY George F. Bethel

A DEVICE TO IDENTIFY INDIVIDUAL WIRES IN A RANDOM BUNDLE

FIELD OF THE INVENTION

This invention is directed to the field of wire identification and finds particular utility in the identification of individual wires in a multiple wire cable. Such identification of individual wires is required in the original assembly and checkout of multiple wire cables with their terminating devices, such as multipin connectors and also in the later trouble shooting of such cables, connectors and the electronic equipment coupled thereby.

DESCRIPTION OF THE PRIOR ART

Electrical equipment is wired in many instances with a multiplicity of wires which have been soldered or wrapped on a specific set of terminals. The terminals may be in a plug, which has a series of predesignated connection points, and which is in turn generally plugged into an analogous receptacle which receives the plug for making an electrical connection.

Oftentimes, wires are connected between two distant points on circuit boards or panels which have analogous designations to the points which they have been previously wired to. The ability to identify the particular designation the wire has been adjusted at a location remote from the point to which it has been initially connected or wired is difficult. This has been particularly true when a large bundle of wires has been preconnected to a plurality of predesignated connection points and led in a bundle, harness, or conduit to a distant location. When the bundle has been led to a distant location it is virtually impossible to determine the predesignation of the wire, and/or the predesignated point to which it has been connected to.

Prior art methods for determining the designation of a particular wire in the bundle have been cumbersome at best. Some have relied upon a contacting of a bell at the loose end of wires in the bundle and trying to complete an electrical loop so that the circuit will ring the bell and indicate the proper designation thereof. Other methods have involved connecting the wire found at the loose end of the bundle to a light and completing an electrical circuit to light the light. As can be appreciated, this is a time-consuming repetitious process. For example, in a bundle of 50 or 100 wires when the designation of a wire at its loose end is to be made, the user of the foregoing systems must go through the wires on a wire by wire basis to determine its designation. Thus, in a bundle of 100 wires the user could conceivably be required to go through 99 wires until coming to the correct one.

The foregoing method of finding predesignated wires in a loose bundle is not only time consuming, but can be inaccurate as well. Furthermore, it is usually necessary to strip the insulation from the ends of the wire in order to make contact with the bell or light circuit and thus determine its designation. Another drawback of the foregoing method, is the fact that the clip leads are oftentimes used to make contact between the bared end of wire and the indicator. As can be appreciated, the clip leads can substantially damage the wire. Furthermore, the use of a clip lead for very fine wires, can often damage the wires sufficiently so that they will not function as well as they might have, had the clip lead not been utilized.

There have been numerous attempts to designate a particular wire in a bundle by means of probes. Such probes have sometimes been utilized in a manner whereby a current has been induced therein when passed through a bundle. Furthermore, actual contact on the wire by sharp points through the insulation has been utilized. These methods damage the insulation of the wire, as well as flexing them in an intolerable manner while they are in their bundled configuration.

Oftentimes it is necessary to designate a particular wire in a preconnected bundle of wires at some position intermediate their connection points. As can be appreciated, it is difficult to designate such a wire which has been predesignated by merely pulling it from the middle of a random bundle.

It has oftentimes been necessary in conduits of multiple cables or wires to designate which particular cable or wire is connected to another contact point. If, telemetry of the particular designation of the wire could be effectuated between the point of connection and the end at which the designation is sought in a removed location, time and costs of searching for the proper designation of the wire could be substantially eliminated.

An analogous situation to the foregoing is that which exists in large harnesses of a multiplicity of wires in computers wherein, the wires are to be connected to a second predesignated set of terminals. In order to have a properly designated wire connected to its analogous connection at a distant point, it has been necessary to use the previously described ringing or lighting methods to designate the wire by going through the bundle in a random manner hoping to find a particular wire which is so designated to complete the loop.

Further difficulties are also encountered when wires marked with their designations by means of tags, labels, etc. have the designations thereon blurred or rubbed off. Such removal often takes place merely from the rubbing that takes place during normal handling.

By means of this invention, the foregoing deficiencies are substantially eliminated from the wire detection art. By means of this invention, a substantial improvement in accuracy, short circuit detection, speed and efficiency of determining the designation of a wire, and maintaining the wire in an undamaged condition is provided.

SUMMARY OF THE INVENTION

This invention comprises a process and apparatus for determining the designation of wires by means of a readout which is preferably a digital or symbolic representation thereof. The invention accomplishes the readout by means of an electrical matrix which coincides with sequential designatory symbols within an electrical loop which is completed through the readout apparatus. The matrix subdivides an electrical input therethrough in a discriminatory manner to provide an electrical signal to an amplification means to cause display of the appropriate digit or symbol.

The electrical input to the matrix is provided by a low voltage source in contact with the loose end of the wire which has been predesignated. The low voltage source is introduced to the wire through a nonscratching or insulation impairing source. Specifically, contact with the predesignated wire is made through an electrically conductive fluid, or by causing a flow of current in the predesignated wire through use of the limited amounts of voltage which exist between two bodies.

The invention further provides a matrix which can be utilized to accept a plurality of differently designated wires. This is accomplished by means of the matrix accepting a group of different plugs which have predesignated wires connected thereto but which when plugged into the matrix provide a common means of identification.

The invention further provides a simplified contacting of the wires at the loose end thereof to provide the foregoing readout or designatory symbol.

A further provision of the invention is to provide telemetry of the designated symbol for each particular wire at a distant location where the loose wire is to be designated.

In light of the foregoing background of this invention it can be seen that it provides a substantial step forward in the art of wire detection; specifically for determining a particular designation of a wire in a multiplicity of loose wires which have been connected at the other end to a predesignated point. The invention also provides a means to determine shorts or impaired insulation in a bundle of wires. Thus, if two wires in the bundle are shorted through impairment of insulation, or at their terminals, such a short may be readily detected.

BRIEF DESCRIPTION OF THE DRAWINGS

FIG. 2 shows an external perspective view of an embodiment of this invention;

FIG. 3 shows an alternative embodiment of a portion of this invention; and

FIG. 4 is a partial section along line 4—4 of FIG. 3.

DESCRIPTION OF THE PREFERRED EMBODIMENTS

Figure 1:
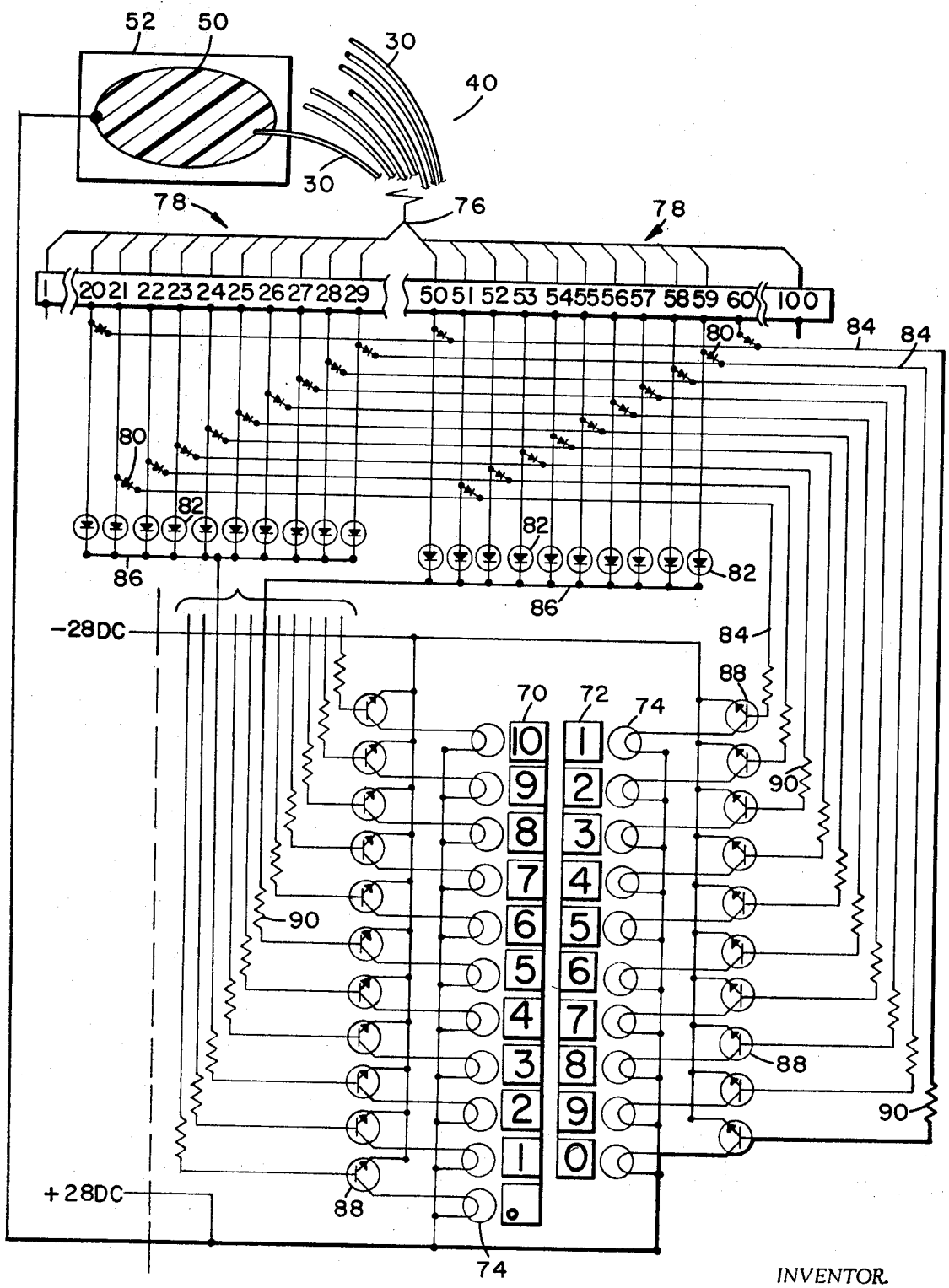
FIG. 1 is a fragmented partial line diagram of the electrical connections and components of this invention.

Looking more specifically at FIG. 2, a cabinet 10 is shown connected to a second cabinet 12. The cabinets are provided a degree of portability by their respective handles 14 and 16. The second cabinet 12, hereinafter referred to as the receptacle cabinet is provided with a number of receptacles 18, 20, 22, and 24. The receptacles 18, 20, 22 and 24 are of the type which receive a plug 26, such as that shown seated in the receptacle 20 for interconnecting a group of wires. The plugs may be secured to the cabinet 12 in any suitable manner, however, in this embodiment they are secured by means of rivets or screws 28.

The plug 26 or connector is usually plugged into a suitable receptacle such as that shown at 20. The plug 26 has a series of connection points to which the wires 30 are attached. Each wire 30 is attached to the plug 26 and has a predesignated symbol or number which is analogous to the respective circuit or electrical function which it is to interconnect. A group of wires 30 can be used to interconnect two respective areas by means of two plugs 26 and two respective receptacles 20 which have analogously designated wires interconnecting them for providing a proper interconnection.

In many instances instead of the wires being connected to a plug 26, the wires 30 lead to designated points for interconnecting them to plug 26. It is generally the case, that where a plug 26 is used for interconnecting one point to a series of other points, that the plug is first connected or wired with the wires 30, or made by a production process which connects the wires thereto. Subsequently the wires 30 are hand connected by means of soldering or wire wrapping them to terminals at a removed location. A problem arises as to which wire emanating from its predesignated location on the plug is being held. As previously stated, the method of making this determination was to interconnect the wire at the plug connection with a ringing or lighting device and randomly trying to find which wire at the other end in the bundle completes the circuit.

By means of this invention the foregoing process is eliminated by the operator taking one of the wires 30 from his hand 32 in a bundle 40 and touching it to a contact point 34 which by means of this invention provides a readout 36 on the display unit 38. The readout 36 provided on the display unit 38 is such that it corresponds to the predesignatory symbol of the wires 30, specifically that of the wire which contacts the contact point 34.

The receptacles 18, 20, 22 and 24 provide receipt for various sizes and configurations of plugs. Thus, a group of wires 30 which have been connected to those plugs may be detected by contacting one of them from the bundle 40 of loose wires.

In practice, the receptacle cabinet 12 in which all the receptacles 18, 20, 22 and 24 are located are interconnected to a common outlet receptacle 42. The outlet receptacle 42 interfaces the receptacle cabinet 12 with the first cabinet 10 hereinafter referred to as readout cabinet. The cabinets 10 and 12 are interconnected by a plug 44 having a group of wires connected thereto for analogous interfacing to the readout cabinet 10 through a series of wires 46. The wires 46 are connected to the readout cabinet 10 at appropriate connections generally shown at 48, which may comprise a plug and receptacle analogous to those shown at 44 and 42.

It should be understood that the receptacle cabinet 12 is only for purposes of providing a plurality of receptacles into which a respective plurality of different-type plugs may be seated. Thus, a number of different type plugs with their respective wires 30 may be designated at the random bundle end 40 by the common ability provided by cabinet 12. As an alternative the readout cabinet 10 may be enlarged or have a plug or group of plugs incorporated therein for purposes of providing the same function.

By means of the readout cabinet 10, the plug 26 having a group of wires 30 which are predesignated with respect to the plug can have those designations read out on the display unit 38. The display unit 38 may be a screen, an edge lit readout device, or any other suitable digital character or symbolic display device.

In operation, a wire 30 from the loose bundle 40 is contacted to the contact point 34. The contactor 34 may be of any suitable material depending upon the voltage requirements between the wire 30 and the contact point 34. As will be later explained, the device requires a very low voltage for providing the readout 36. The specific contactor shown at contact point 34 is a sponge 50 which has a conductive liquid such as salt water placed thereon. The sponge 50 is held in place by a frame 52. The sponge 50 is connected to a suitable connection for providing a circuit as will be later explained.

As an alternative embodiment, a wire 54 which is seated in an appropriate socket 56 is connected to the same point to which the sponge 50 is connected. The wire 54 connects felt or any other fuzzy material of a finger cover 58, into which the finger of a person may be inserted. The felt material is wetted with an appropriate electrically conductive liquid, so that when it is touched to a wire 30 which has been selected from the bundle 40 it will complete an electrical loop to provide a visual display of the designation of the wire on the display unit 38.

As an alternative contactor for making the loop to provide the readout 36 on the readout cabinet 10, the embodiments shown in FIGS. 3 and 4 may be utilized. A wire 60 is connected in the same manner as the wire 54 to the socket 56 which is in common with the same connection as the sponge 50. The wire 60 is connected to a spongelike, fuzzy, or other resiliently soft material 62 which is clamped between an upper member 64 and a lower member 66 which form a pair of jaws. The jaws are supported on a column 68, but may be supported in any suitable manner and held in close juxtaposition so that the resilient material 62 is forced against the wires 30, close to the random end of the bundle 40. The wires 30 are held sufficiently tight so that when they are withdrawn they contact a portion of the resilient material 62. The resilient material 62 has an electrically conductive fluid therein which facilitates conduction of current therethrough to interconnect one of the wires 30 with the wire 60 forming a loop for the proper readout 36 of the designation of that particular wire.

It should be understood that other materials other than those resilient materials 62, 58 and sponge 50 may be utilized which will provide sufficient conductivity. For instance, if the gain provided by the invention, is sufficient so that a minimal voltage can be utilized, there is no need for the electrically conductive fluid.

Looking more specifically at FIG. 1 in conjunction with the foregoing described apparatus, a group of digits 70 and 72 are shown in columnar form. The columnar grouping in practice are digits which have been formed in clear plastic which surrounds each particular number in the columns of the digits 70 and 72. Thus, when a light 74, such as those shown next to the columnar digits 70 and 72, is lit, the light will be transmitted through the clear plastic and cause an illumination of the digits next to that particular light which it is adjacent to. In this manner, the column of digits 70 and 72 provide what is commonly known as an edge lit readout display.

Looking more specifically at the upper part of the drawing of FIG. 1, a series of numbers from 1 to 100 are shown in fragmented form. The numbers 1 and 100 are shown with a fragmented decade grouping of two decades of the numbered series, namely those between 20 and 29 and 50 and 59. The fragmented grouping of numbers between 1 and 100 represent the respective receptacles for each prong of a plug such as that shown by 26 (see FIG. 2) having analogously designated connection points. The fragmented series of numbers correspond to designated connection points 78 of a receptacle such as those shown at 18, 20, 22 and 24 into which the prongs of a plug like that shown at 26 are seated for connection purposes. In other words, the fragmented series of numbers represent a common receptacle with a number of designated holes 1 through 100 for the receipt of corresponding prongs. The plug which is not shown, can be represented by any suitable plug which can be received by its respective receptacle. For purposes of illustration the plug 26 is represented as the apex 76 which has a group of prongs numbered in common with those numbered 1 through 100. Connected to the prongs through the plug 26 are a series of wires 30 which are shown at their random bundled end 40. It should be understood that any suitable plug may be utilized having a series of prongs which match the receptacle in the same designatory manner. Thus the fragmented numbered series of points 78 for receipt of a prong can be used with any appropriate matching receptacle and plug.

When the common plugging means 76 is seated in contact with the points 78 of the receptacle, the wires 30 can then be contacted to form the electrical loop for a readout and display as indicated at 36.

A suitable power supply is provided across the lines having a voltage of 28 volts DC. This power supply may be from any suitable source and is introduced by means of a toggle switch 80 (see FIG. 2) which is in turn connected to a suitable display light 82 to indicate that power is on.

When the power is on, it can be appreciated that there is a suitable EMF delivered to the sponge 50 within the frame 52. As previously alluded to, the sponge 50 may be substituted or connected in common with the finger cover 58 (see FIG. 2) or the resilient materials 62 (see FIGS. 3 and 4). For purposes of understanding, however, the explanation hereinafter will relate to the sponge 50.

The wires 30 at the loose end of the bundle 40 have designations related thereto in common with those from 1 to 100, or any other suitable symbols. However, for purposes of explanation, the wires 30 have been designated by numbers, so that each loose wire 30 at the loose bundle end 40 is connected to a plug connection matching the points 78 of the receptacle.

Each numbered designatory point 78 of the receptacle has a wire leading into the matrix. Each number, representing a designated wire, has two conjunctive gates in the form of signal diodes 80 and 82. The signal diodes 80 are connected to common busses 84 which are in turn connected to each respective unit digit 72 of the display. Each unit digit 72 in the units column is connected to a common bus for all of similar units digits in the numbers from 1 to 100. The signal diodes 80 prevent the reverse flow of current back through the system.

A group of common busses 86 are provided for each respective digit 70 in the tens column. Each common bus 86 is connected to its respective tens digit in the entire group of the decade by means of the signal diodes 82. The signal diodes 82. The signal diodes 82 are placed within the line for purposes of precluding any unwanted reverse feedback through the system. Each of the foregoing busses 84 and 86 are respectively connected for appropriate lighting of the lights 74 adjacent the columns of digits 70 and 72.

The lights 74 are placed on line through the following switching device. The 28-volt DC power supply is connected to each emitter of a group of NPN transistors generally shown at 88. The bases of the NPN transistors 88 allow signals from their respective tens of units digits bus bars 86,84 to be amplified into an EMP suitable to light each respective light 74, coupled to their collectors.

A group of resistors 90 are shown in series with each respective bus. The resistors are provided because oftentimes the voltage which is supplied through the sponge 50 is of sufficient magnitude to damage the transistors 88. However, in the eventuality the current through the busses and the attendant lines is not of sufficient strength to light the light 74, the circuitry and invention provided herein will provide sufficient gain to light the light 74.

In operation substantially reduced voltages may be utilized for purposes of closing the electrical loop so that when they are introduced to the base of said transistors 88 they will be sufficiently amplified to light the light 74. For instance with this invention, it has been found that when one of the wires 30 is connected to a fuzzy material such as felt or tufted fine fabric that a given transistor circuit having sufficient amplification characteristics will light the light 74.

When felt or tufted materials are used as the contactor, it is possible to cause the readout to light without the use of an electrically conductive liquid. For instance, if the gain of the transistorized elements is sufficient, by means of multiple amplification, a minimum voltage on the contactor can be amplified to cause the light 74 to light. Thus, multiple transistors can be used if properly biased to cause a material having a relatively low conductance to perform as a contactor. As an example, it has been found that felt by itself is sufficient to create enough electrical potential to cause the lights 74 to light when multiple transistorized amplification is utilized.

It should be appreciated that other display devices other than the edge lit readout display as shown in FIG. 1 may be used. For instance, other digital readout devices which display a numerical character representation may be utilized as long as they correspond to the proper designatory sequence.

An added feature of this invention is that the wires 30 may be contacted to a suitable contactor 34 at a substantial distance from the receptacles. This information may then be transmitted by any telemetry system such as an RF transmitter from a remote location to where the wires are connected to the plug. Thus, the readout cabinet 10 may be actuated by an analogous RF signal received by a receiver therein.

In addition to the foregoing disclosure with regard to the identification of wires 30 within a bundle 40, it is also possible to determine the discrete portions, prongs, plugs, and/or connection points of a receptacle and/or a plug. When a plug or receptacle having a plurality of electrical points in closely related juxtaposition, is to be wired, a determination must be made of the designation of those points. This invention enables an interfacing of the plug or the receptacle with the receptacle cabinet 12 for appropriately interconnecting it by a Y within the electrical loop provided by the foregoing matrix. In this manner, a touching of a wire 30 or other suitable probe may be utilized to indicate through the display whether contact is actually being made with a respective designatory point on the plug or receptacle.

From the foregoing it can be seen that not only can a random group of wires with previously designated symbols attached thereto be properly identified, but also a plurality of closely related juxtaposed pins, or other contact points may be identified.

This invention also provides the display of an excess of numbers or the small cipher in the tens column when wires have been short circuited within the bundle or at the terminals thereof. Additionally, the display will indicate a short in the terminals of a plug or receptacle when they are interfaced with the receptacle cabinet 12.

Other devices may be used in conjunction with the invention herein, for purposes of marking a designatory symbol on a wire. For instance, if it is so desired, a marking device in lieu of the readout symbol may be utilized so that when a wire is designated, it may be either automatically or hand implaced within a suitable marking device having a stencil or other printing means thereon for printing the designatory symbol on the wire.

It can be seen from the foregoing description that the wire detection device of this invention has many attendant advantages. However, various changes may be made in the form, conception, arrangement of the parts and process of this invention, without departing from the spirit and scope thereof.

I claim:

1. An apparatus for indicating the preassigned designatory indicia of a conductor in a multiconductor cable comprising: receptacle means having a plurality of connection points, each of said connection points being assigned a designatory indicia, and adapted to receive and electrically couple plug means to which the first end of conductors of a multiconductor cable are attached to provide each conductor with a preassigned designatory indicia; a multidecade encoding matrix having a plurality of inputs and a plurality of outputs; first coupling means, coupling each of said connection points of said receptacle means to a different one of said plurality of matrix inputs; a plurality of second coupling means, one for each decade of said matrix coupled to selected outputs thereof; a plurality of third coupling means, one for each unit of said decade, coupled to selected outputs of said matrix; a plurality of first illuminating means, one for each decade, each first illuminating means coupled to its associated second coupling means; a plurality of second illuminating means, one for each unit of said decade, each of said second illuminating means coupled to its associated third coupling means; first indicia carrier means associated with said first illuminating means to provide a display of the indicia associated with the associated first illuminating means; second indicia carrier means associated with said second illuminating means to provide a display of the indicia associated with the associated second illuminating means; probe means coupled to said first and second illuminating means and arranged to be contacted by the second ends of conductors of a multiconductor cable having its first ends connected to a plug placed in said receptacle means; power supply means coupled to said first and second illuminating means and said probe means; whereby when the second end of a conductor is placed in contact with said probe means a complete circuit is established through the conductor, said receptacle means, said matrix to selected outputs thereof, and the associated first and second illuminating means to display the preassigned designatory indicia of said conductor.

2. An apparatus as defined in claim 1 further comprising first driver means coupled between said second coupling means and said first illuminating means and second driver means coupled between said third coupling means and said second illuminating means.

3. An apparatus as defined in claim 1 wherein said probe means is a resilient material containing an electrolyte.

4. An apparatus as defined in claim 1 wherein said first and second indicia carrier means have numerical indicia thereon.

UNITED STATES PATENT OFFICE
CERTIFICATE OF CORRECTION

Patent No. 3,609,538                    Dated    September 28, 1971

Inventor(s)     Ronald H. Schag

It is certified that error appears in the above-identified patent and that said Letters Patent are hereby corrected as shown below:

Column 1, line 26, "adjusted" should be -- assigned --

Column 5, line 49, delete "the signal diodes 82."

Column 5, line 59, delete "of" should be -- or --

Column 5, line 60, delete "EMP" should be -- EMF --

Signed and sealed this 21st day of March 1972.

(SEAL)
Attest:

EDWARD M. FLETCHER, JR.          ROBERT GOTTSCHALK
Attesting Officer                Commissioner of Patents